United States Patent
Kao et al.

(10) Patent No.: US 6,245,462 B1
(45) Date of Patent: Jun. 12, 2001

(54) BATTERY GRID AND METHOD OF MAKING

(75) Inventors: Wen-Hong Kao, Brown Deer; Edward N. Mrotek, Grafton, both of WI (US)

(73) Assignee: Johnson Controls Technology Company, Plymouth, MI (US)

(*) Notice: Subject to any disclaimer, the term of this patent is extended or adjusted under 35 U.S.C. 154(b) by 0 days.

(21) Appl. No.: 09/315,445

(22) Filed: May 20, 1999

(51) Int. Cl.[7] .............................. H01M 4/74; H01M 4/56; H01M 4/64; H01M 4/72; B23P 13/00
(52) U.S. Cl. ..................... 429/241; 429/225; 429/233; 429/242; 29/2
(58) Field of Search .................... 429/233, 241, 429/242, 225; 29/2

(56) References Cited

U.S. PATENT DOCUMENTS

| | | |
|---|---|---|
| 1,524,610 | 1/1925 | Ahlgren . |
| 2,079,727 | 5/1937 | Wirtz ........................................ 22/57 |
| 3,009,459 | 11/1961 | Ruben ..................................... 128/29 |
| 3,486,942 | 12/1969 | Hatterschide .......................... 136/67 |
| 3,779,816 | 12/1973 | Mao ....................................... 148/6.3 |
| 3,989,539 | 11/1976 | Grabb .................................... 429/241 |
| 4,151,331 | 4/1979 | Hug et al. .............................. 429/94 |
| 4,189,533 | 2/1980 | Sugalski ................................ 429/223 |
| 4,196,757 | 4/1980 | Hug et al. .............................. 141/1.1 |
| 4,199,849 | 4/1980 | Moreau .................................. 29/2 |
| 4,221,032 * | 9/1980 | Cousino et al. ........................ 29/2 |
| 4,320,183 | 3/1982 | Quereshi ................................ 429/211 |
| 4,345,452 | 8/1982 | Eberle .................................... 72/452 |
| 4,358,892 | 11/1982 | Turillon et al. ....................... 29/623.5 |
| 4,443,918 * | 4/1984 | Morinari et al. ....................... 29/3 |
| 4,455,724 | 6/1984 | Sperling et al. ........................ 29/2 |
| 4,477,546 | 10/1984 | Wheeler et al. ....................... 429/211 |
| 4,906,540 * | 3/1990 | Hoshihara et al. ................... 429/242 |
| 5,264,306 | 11/1993 | Walker, Jr. et al. .................. 429/160 |
| 5,308,719 | 5/1994 | Mrotek et al. ........................ 429/160 |
| 5,350,645 | 9/1994 | Lake et al. ............................ 429/124 |
| 5,506,062 | 4/1996 | Flammang ............................ 428/614 |
| 5,543,250 | 8/1996 | Yanagihara et al. .................. 429/241 |
| 5,578,398 | 11/1996 | Jenkins et al. ........................ 429/233 |
| 5,582,936 | 12/1996 | Mrotek et al. ........................ 429/241 |
| 5,595,840 | 1/1997 | Henning et al. ...................... 429/210 |
| 5,989,749 * | 11/1999 | Kao et al. ............................. 429/241 |

FOREIGN PATENT DOCUMENTS

| | | | |
|---|---|---|---|
| 0 589 549 | 3/1994 | (EP) | ............................ H01M/4/73 |
| 1 377 039 | 12/1974 | (GB) . | |
| 1377039 * | 12/1974 | (GB) . | |
| 2 127 614 | 4/1984 | (GB) | ............................ H01M/4/73 |
| 60-150556 | 8/1985 | (JP) | ............................ H01M/4/73 |

OTHER PUBLICATIONS

Patent Abstracts of Japan, Abstract for JP 63 051054, Published: Mar. 4, 1988.
PCT Search Report for PCT/US00/12569 (Aug. 11, 2000.

* cited by examiner

*Primary Examiner*—Tom Dunn
*Assistant Examiner*—Zidia Pittman
(74) *Attorney, Agent, or Firm*—Quarles & Brady LLP

(57) ABSTRACT

A battery grid, suitable for use in a lead-acid battery, with a grid upper portion having a grid wires defining a first grid pattern, and a grid lower portion electrically connected to the grid upper portion. The grid lower portion having grid wires defining a second grid pattern, wherein the first grid pattern is different from said second grid pattern to improve the conductivity of the grid.

20 Claims, 4 Drawing Sheets

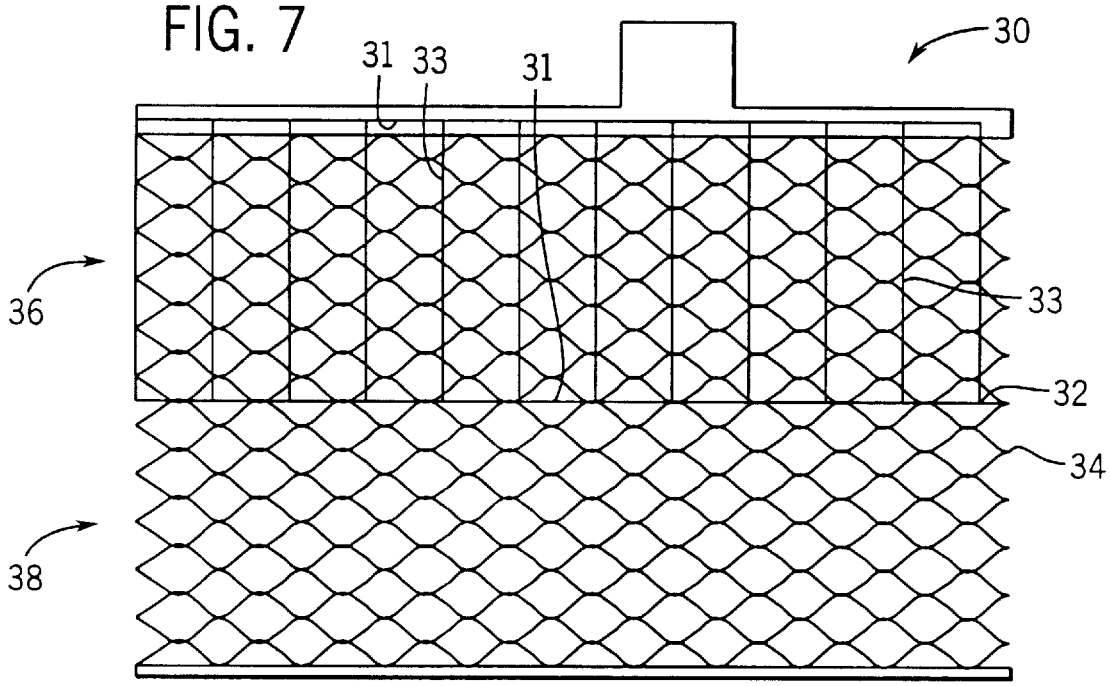

BATTERY GRID AND METHOD OF MAKING

TECHNICAL FIELD

The present invention relates to battery grids, and more particularly to lead-acid battery grids having a plurality of grid patterns.

BACKGROUND OF THE INVENTION

Grids for lead-acid batteries provide structural support for the active material therein, and also serve as a current collector during discharge and current distributor during recharge. Accordingly, grid designs seek to optimize the amount of active material supportable by the grid to increase the current collection and distribution characteristics of the grid while minimizing the grid weight.

Known prior art grid designs, such as shown in FIGS. 1–3, include a top frame member 2 and a bottom frame member 3 joined by a plurality of metal wires 4 forming a pattern interposed between the frame members 2, 3. A lug 5 formed as an integral part of the top frame member 2 is interconnected with adjacent grids in a battery.

Known grid patterns include a diamond pattern, characterized by wires defining diamond shaped grid cells, such as shown in FIGS. 1 and 2, a rectangular pattern, characterized by rectangular grid cells, a radial pattern characterized by wires extending radially from a common point, such as shown in FIG. 3, and other grid patterns, such as disclosed in U.S. Pat. No. 5,582,936. These particular patterns have certain advantages and disadvantages which are discussed in further detail below.

Battery grids are commonly manufactured by processes, such as casting, expanded metal forming, and stamping. Cast battery grids are manufactured by pouring molten lead into a mold, allowing the lead to cool, and then separating the grid from the mold. The casting process is capable of producing a variety of efficient grid designs, which are limited only by the ability of mold makers to make the mold.

The casting process is, however, an expensive process which discourages its use. The process requires the use of a mold coating to facilitate separation of the grid from the mold, and for an increased throughput, a plurality of expensive molds are required. Furthermore, even with multiple molds, the casting process is still a batch process which tends to have a lower productivity (i.e., produces less product over a given time period) than a grid manufacturing process which is "continuous," such as expanded metal forming.

Grids formed from expanded metal are less expensive than molded grids because of the higher productivity of the expanded metal forming process over the casting process. In the expanded metal process, battery grids are formed by expanding metal through a process in which a strip of cast or wrought lead material is pierced and then pulled or expanded. In a conventional expanded metal grid, the grid mass is substantially evenly distributed across the grid, and the grid is limited in wire pattern, wire shape, and lead distribution.

Two particularly common expanded metal forming processes, rotary expansion and reciprocated expansion, have been developed. In the rotary expansion process, a lead strip is cut with a rotary cutter, the wires are extruded above and below the plane of the strip and then expanded in the horizontal directions to form a diamond grid pattern interposed between top and bottom frame members. In the reciprocated expansion process, wires defining a diamond grid pattern are cut and expanded in a direction perpendicular to a surface of the strip. After expansion, the strip is rotated 90°, and the grid is coined. The size of the diamond and the wire width are variables in either process.

The wire angle and wire size of an expanded metal grid pattern are limited to ensure proper expansion without breaking the wires. The wire angle, as shown in FIG. 1, is the angle A of the grid wires with respect to the top or bottom frame member 2, 3, and is typically less than 40° in an expanded metal grid. This wire angle limitation creates a zigzag path for current to flow through the grid. The zig-zag pattern increases the grid resistance because the current does not flow directly to the collecting lug, such as in a radial grid formed by casting.

The wire size limitation also limits the taper rate to 15% or less for the rotary process, and 60% or less for the reciprocated process. The taper rate, best illustrated in FIG. 3, is the rate at which a wire width can be changed along its length. For example, with a 15% taper rate, the maximum wire width near the current collecting lug is 15% wider at the grid top than that at the grid bottom.

More lead mass in the lug area would enhance the current carrying capability of the grid and reduce the grid resistance because the current generated in a plate flows toward the lug. These features are difficult to achieve using the expansion process. Thus, the conductivity of expanded metal grids tend to be lower than a similar size cast grid.

Furthermore, there is no side frame in an expanded metal grid to restrict growth of the wires. Thus, the service life of an expanded metal grid is considerably shorter than the cast equivalent due to the upward growth of a positive expanded grid in a battery resulting in either shorting with an adjacent negative strap or loss of positive active materials.

BRIEF SUMMARY OF THE INVENTION

The present invention provides a battery grid, suitable for use in a lead-acid battery, with a grid upper portion having a grid wires defining a first grid pattern, and a grid lower portion electrically connected to the grid upper portion. The grid lower portion has grid wires which define a second grid pattern. The first grid pattern is different from said second grid pattern to improve the conductivity of the grid.

In another aspect of the present invention, a battery grid includes a top frame member. Non-expanded metal wires extending from the top frame member are electrically connected to expanded metal wires to form a multi pattern grid.

The general objective of the present invention is to provide a battery grid with improved conductivity. This objective is accomplished by providing a grid having more than one grid pattern.

Another objective of the present invention is to provide a battery grid which can be produced using a high productivity process. This objective is accomplished by providing a method of making a battery grid which includes a metal expanding process.

Yet another objective of the present invention is to extend the service life of the grid. This objective is accomplished by incorporating a second grid pattern with an enlarged top frame portion and/or side frames, the service life of the grid can be extended because of reduced growth grid.

These and still other objects and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 7 is a schematic of a battery grid incorporating the present invention with a rectilinear grid pattern joined to an upper portion of a battery grid having a diamond grid pattern.

DETAILED DESCRIPTION OF THE PREFERRED EMBODIMENTS

Figure 4:
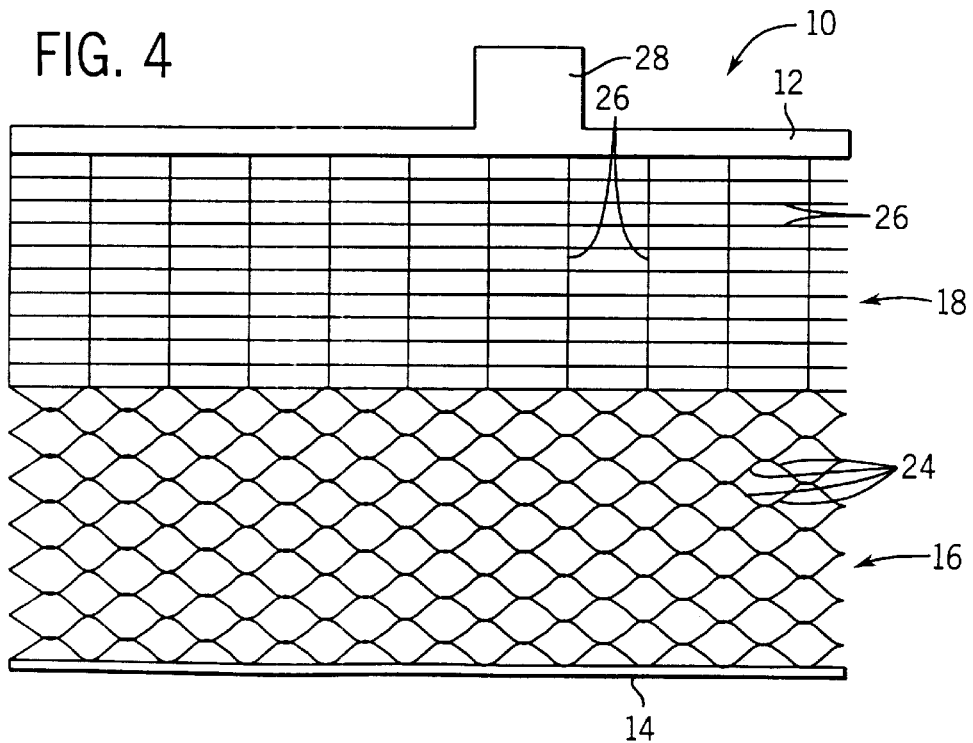
FIG. 4 is a schematic of a battery grid incorporating the present invention with an upper portion having a rectilinear grid pattern.

The present invention provides an improved expanded metal lead-acid battery grid. As shown in FIG. 4, a lead-acid battery grid 10 has a top frame member 12 and an opposing bottom frame member 14. A lower portion 16 of the grid 10 includes a plurality of expanded metal wires 24 defining a diamond grid pattern, and extend from the bottom frame member 14 toward the top frame member 12. The expanded metal wires 24 are joined to an upper portion 18 of the grid 10 which include a plurality of wires 26 defining a rectilinear grid pattern extending from the top frame member 12 toward the bottom frame member 14. The wires 24, 26 are electrically connected to allow electrical current to flow therebetween.

Figure 5:
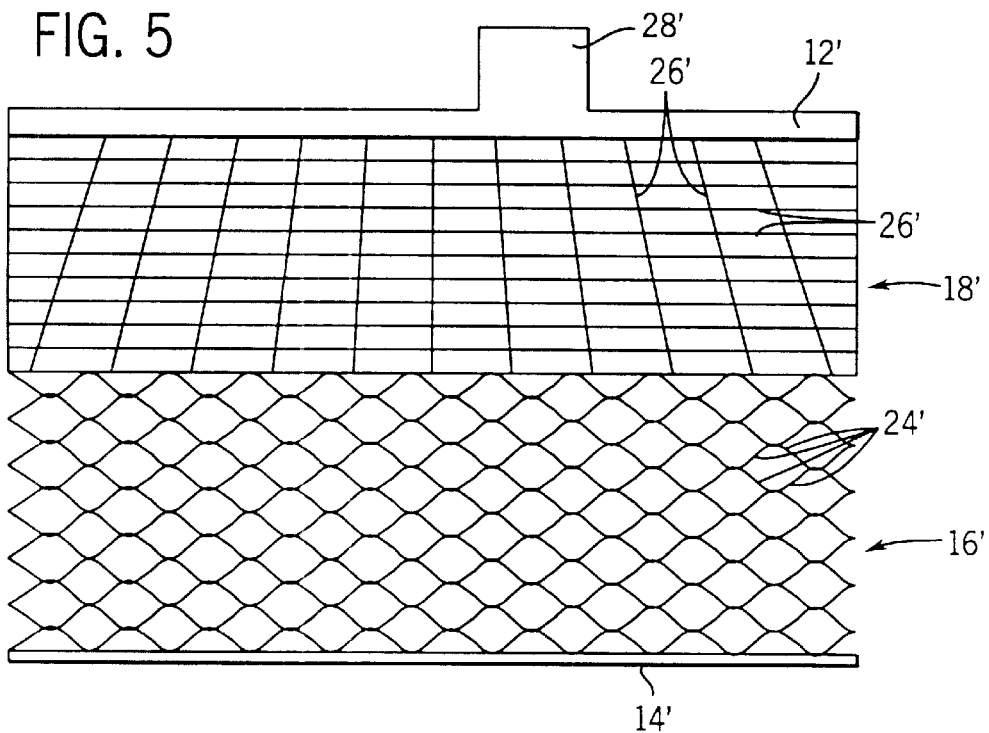
FIG. 5 is a schematic of a battery grid incorporating the present invention with an upper portion having a radial grid pattern.
Figure 6:
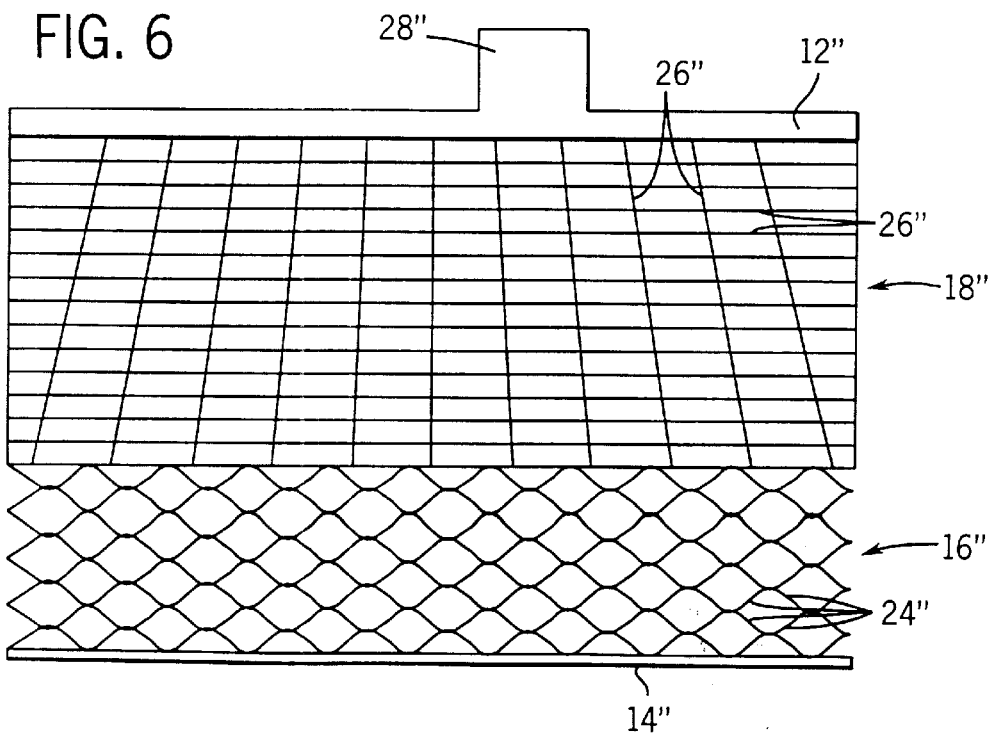
FIG. 6 is a schematic of another battery grid incorporating the present invention with an upper portion having a radial grid pattern.

A current collection lug 28 is formed as an integral part of the top frame member 12, and, preferably, includes an enlarged conductive section, such as described in U.S. Pat. No. 5,582,936, which is fully incorporated herein by reference. Preferably, the mass of the wires 26 in the upper portion of the grid is greater than the mass of the expanded metal grid wires 24 to improve grid conductivity. FIGS. 5 and 6, disclose additional, more preferred, embodiments of the present invention, and have like components referenced with the same reference numbers and differentiated with a "'" or "''".

Desirable grid patterns provide a grid 10 with a low grid resistivity, which translates into a high efficiency, and a low grid weight. Resistivity of Grid, RG, and grid efficiency can be calculated by methods known in the art, such as by modeling a grid as a network of resistors. The grid efficiency is defined to be the geometric area of the grid divided by RG and grid weight. RG is defined to be the overall resistance times the geometric area of the grid. The grid weight is calculated by multiplying grid density with the total volume of the wire members.

In one well known model for determining RG, each wire is assumed to act as a resistor, and its resistance is determined by the conductivity of the grid material, length and the average cross-section of the wire. The potential and current distributions in a grid can be determined by application of Kirchhoff's first law to each grid node, namely, that the algebraic sum of all currents flowing into the node, i.e., the junction of wire members, must be zero. Assuming homogeneous distribution of current, the total current flow through a grid under a given voltage drop is calculated and the overall grid resistance is defined by Ohm's law. Details of this modeling technique are described in the literature (W. Tiedemann, J. Newman and F. DeSua in Power Sources 6, D. H. Collins Ed., Academic, New York, 1976).

Using the modeling technique described above, resistivity and efficiency of several grid designs including a cast grid with a radial wire pattern, conventional expanded metal grids, and grids incorporating the present invention were calculated. The grids are described, and the calculated results are compared in Example I below. The grid parameters and calculated results are also tabulated in Table I.

EXAMPLE I

Figure 1:
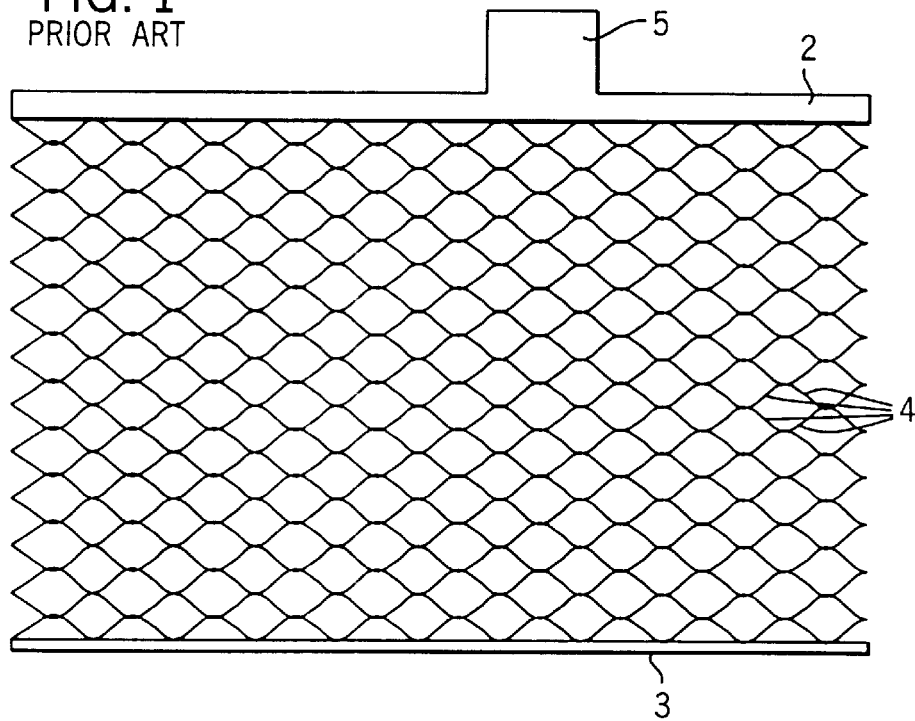
FIG. 1, is a schematic of a prior art battery grid having a diamond pattern.
Figure 2:
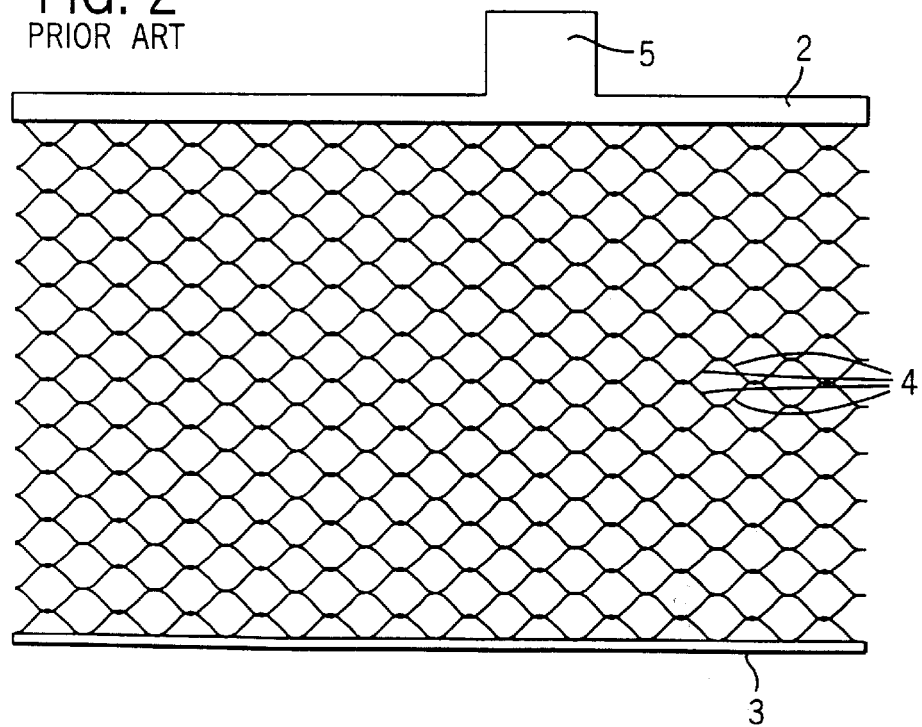
FIG. 2 is a schematic of another prior art battery grid having a diamond pattern.
Figure 3:
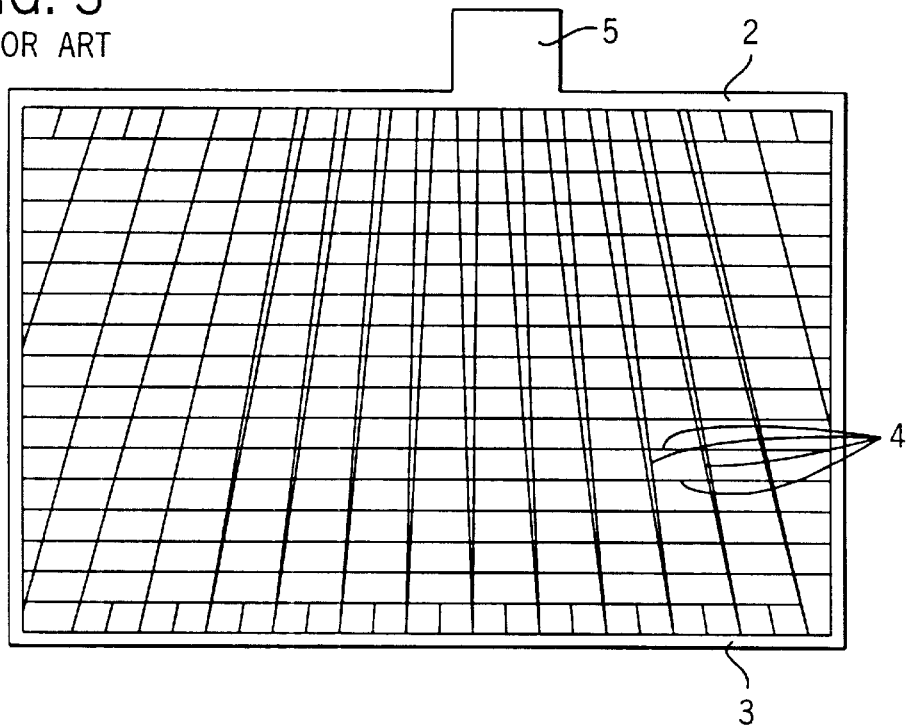
FIG. 3 is a schematic of a prior art battery grid having a radial pattern.

All the grids in this example are 4.00" tall and 5.69" wide. Grid 1, schematically shown in FIG. 1, is conventional 0.035" thick rotary 22-row expanded metal grid, 4.00" tall and 5.69" wide, and a diamond size of 0.542" long and 0.34" wide with 0.035" wide wires. Grid 2, schematically shown in FIG. 2, is an expanded metal grid like Grid 1 but with a smaller diamond. Grid 3, schematically shown in FIG. 4, incorporates the present invention, with a stamped rectilinear wire pattern (wire spacing =0.542")in a grid upper portion 18 and an expanded metal diamond pattern with 12 rows at a grid lower portion 16. Grid 4, schematically shown in FIG. 5, is similar to Grid 3, but has 12 expanded diamond rows at the lower portion 16' and a radial pattern in the grid upper portion 18'. The maximum radial wire width in this grid is 0.120". Grid 5, is the same as Grid 4 except the maximum radial wire width being 0.150" which allows a higher taper rate (0.011"per row vs 0.009" in Grid 4). Grid 6, schematically shown in FIG. 6, is the same as Grid 5 except that there are only 8 expanded diamond rows at the lower portion 16". The cast grid, schematically shown on FIG. 3, is a cast grid having a radial pattern with the parameters disclosed in Table I.

The data in Table I clearly suggests that the cast grid with a radial wire pattern has the best grid conductivity and efficiency. The grid efficiency of the expanded metal grids is only 50% to 60% of the cast grid. As shown in Table I, the conductivity and efficiency of an expanded metal grid will be higher if the diamond size is smaller (Grid 2 vs Grid 1). Replacing the diamond pattern with a rectilinear pattern in the upper portion of the grid, the resistivity is lowered and the efficiency increases (Grid 3 vs Grid 1). The radial wire pattern in the upper portion of the grid is better than the rectilinear pattern (Grid 4 vs Grid 3). Wider radial wires near the lug improves grid conductivity and efficiency (Grid 5 vs Grid 4). Bigger radial wire portion on the top (Grid 6 vs Grid 5) improves grid conductivity and efficiency.

Comparing Grid 6 and the cast grid, even though Grid 6 is 6.7 g heavier, the efficiency of Grid 6 is 83% of the cast grid, an increase of 60% over the conventional expanded metal grid. The difference in grid resistivity is less than 4% which translates into a difference in cold crank voltage of about 16 mV per battery under a typical cold crank current density. This difference is within the variation among batteries and is negligible. A slightly heavier grid and a little difference in cold crank voltage are a small price to pay comparing to cost savings because the grids including a diamond pattern can be formed using a "continuous" process which can be produced significantly faster than the cast grids.

TABLE I

Grid Resistivity and Efficiency of Conventional Designs and the Invention

| Grid | Cast | Grid 1 | Grid 2 | Grid 3 | Grid 4 | Grid 5 | Grid 6 |
|---|---|---|---|---|---|---|---|
| Frame Thickness | 0.043" | 0.035" | 0.035" | 0.035" | 0.035" | 0.035" | 0.035" |
| Wire Thickness | 0.032" | 0.035" | 0.035" | 0.035" | 0.035" | 0.035" | 0.035" |
| Wire Pattern | Radial | Diamond | Diamond | Rect/Dia | Rad/Dia | Rad/Dia | Rad/Dia |
| Diamond Length | N/A | 0.542" | 0.466" | 0.542" | 0.542" | 0.542" | 0.542" |
| Diamond Width | N/A | 0.340" | 0.340" | 0.340" | 0.340" | 0.340" | 0.340" |
| Top Frame Width | 0.250" | 0.200" | 0.188" | 0.200" | 0.200" | 0.200" | 0.200" |
| # of Exp. Rows | 0 | 22 | 22 | 12 | 12 | 12 | 8 |
| Vertical Wire Spacing: | | | | | | | |
| Maximum | 0.458" | 0.542" | 0.466" | 0.542" | 0.542" | 0.542" | 0.542" |
| Minimum | 0.287" | 0.542" | 0.466" | 0.542" | 0.287" | 0.287" | 0.287" |
| Max. Wire Width | 0.170" | 0.041" | 0.051" | 0.120" | 0.120" | 0.150" | 0.150" |
| Wire Taper/row | 0.010" | 0.00 | 0.00 | 0.008" | 0.009" | 0.011" | 0.011" |
| Grid Weight/(g) | 41.86 | 40.58 | 47.48 | 45.42 | 46.78 | 46.98 | 48.56 |
| Grid RG/($\Omega$-cm$^2$) | 0.348 | 0.697 | 0.497 | 0.432 | 0.401 | 0.390 | 0.360 |
| Efficiency (S/g) | 10.126 | 5.218 | 6.256 | 7.520 | 7.873 | 8.061 | 8.441 |

One method of forming a grid incorporating the present invention includes the steps of expanding outer portions of a wide strip to form the lower portion of a grid; stamping an inner unexpanded portion of the strip with a radial wire pattern and the lug to form the upper part of the grid.

In Example II described below, a grid incorporating the present invention is compared to prior art grids. The experimental results comparing the efficiencies of prior art grids to a grid incorporating the present invention are disclosed in Table II below.

EXAMPLE II

Conventional rotary expanded grids, 4.00" tall and 5.69" wide, of various thickness and a diamond size of 0.542" long and 0.34" wide with 0.035" wide wires were measured for overall resistance by passing a current through the lugs of two grids placed in parallel in a sulfuric acid electrolyte and measure the voltage drop from lug to the bottom frame on the far side. The grid weight and RG of these expanded metal grids and a cast grid equivalent are listed as the control group in Table II.

A grid 30 incorporating the present invention, schematically shown in FIG. 7, is formed by overlaying and then spot welding a lead strip 32 of 0.008" thickness onto a 0.030" thick expanded metal grid 34. The lead strip has a 2" wide pre-stamped rectilinear pattern with 0.2" frames 31 and rails 33 0.5" apart. Upon joining the lead strip 32 to the expanded metal grid 34, the grid 30 has a 0.038" thick upper portion 36, and 0.030" thick lower portion 38. The grid weight and RG of this grid are listed in Table II under "Test."

One can see from Table II that the conventional expanded metal grid is inferior to the cast grid equivalent in grid conductivity and efficiency. For example, the difference in RG of the 0.037" strip and the cast grid would be responsible for 0.27 V difference in cold crank voltage under a typical cold crank current density. The test grid is 5 g lighter, the resistance is 20% lower, and efficiency is 40% higher than that of the 0.037" thick grid. With the test grid, the cold crank voltage is only 0.16 V lower and yet the grid is 8 g lighter than the cast equivalent. One can match the grid weight of the cast grid by attaching a second strip with a more efficient pattern, such as a radial wire pattern, and with more lead to further reduce the difference in grid resistivity and thus the cold crank voltage.

TABLE II

Features of Grids

| | Grid Wt. (g) | Grid RG ($\Omega$ cm$^2$) | Efficiency (S/g) |
|---|---|---|---|
| Control Group (Expanded Metal and Book Mold Cast): | | | |
| 0.030" Strip | 33.52 | 0.820 | 4.829 |
| 0.033" Strip | 33.94 | 0.821 | 4.767 |
| 0.035" Strip | 39.53 | 0.706 | 4.756 |
| 0.037" Strip | 40.16 | 0.691 | 4.777 |
| Book Mold Cast | 43.10 | 0.329 | 9.398 |
| Test (0.030" Strip + 0.008" Strip): | | | |
| 0.038" Total | 35.07 | 0.561 | 6.732 |

The grid 10, shown in FIG. 5, may be produced by forming a lead strip into a radial wire pattern having a lug 28, by methods known in the art, such as stamping, cutting, and the like, forming a grid upper frame member 12 and grid upper portion 18. The radial wire pattern strip is joined to a grid lower portion 16 formed from an expanded metal strip using methods known in the art, such as lamination, spot-welding, or the like. The joined strips provide a battery grid 10 having different upper and lower grid patterns to provide improved conductivity.

While there has been shown and described what are at present considered the preferred embodiment of the invention, it will be obvious to those skilled in the art that various changes and modifications can be made therein without departing from the scope of the invention defined by the appended claims. For example, more than two grid patterns may be joined to improve the conductivity of a battery grid over prior art grids.

We claim:

1. A battery grid, suitable for use in a lead-acid battery, comprising:
    a grid upper portion having grid wires defining a first grid pattern of open grid cells; and
    a grid lower portion electrically connected to said grid upper portion, said grid lower portion having grid wires defining a second grid pattern of open grid cells, wherein said first grid pattern is different from said second grid pattern.

2. The battery grid as in claim 1, wherein one of said grid portions is expanded metal.

3. The battery grid as in claim 1, wherein one of said grid patterns is a diamond pattern.

4. The battery grid as in claim 1, wherein one of said grid patterns is a radial pattern.

5. The battery grid as in claim 1, wherein one of said grid patterns is a rectilinear pattern.

6. The battery grid as in claim 1, wherein a central grid portion having a grid wires defining a third grid pattern is electrically connected to at least one of the other grid portions.

7. A battery grid, suitable for use in a lead-acid battery, comprising:
a top frame member;
non-expanded metal wires extending from said top frame member and defining open grid cells; and
expanded metal wires electrically connected to said non-expanded metal wires.

8. The battery grid, as in claim 7, wherein said non-expanded metal wires are formed by stamping.

9. The battery grid, as in claim 7, wherein said non-expanded metal wires define a radial pattern.

10. The battery grid, as in claim 7, wherein said non-expanded metal wires define a rectilinear pattern.

11. A method for making a battery grid suitable for use in a lead-acid battery, comprising the steps of:
forming a diamond pattern of open grid cells in a first metal strip;
forming a non-diamond pattern of open grid cells in a second metal strip; and
joining said first metal strip to said second metal strip.

12. The method as in claim 11, wherein said first metal strip is joined to said second metal strip by laminating.

13. The method as in claim 11, wherein said first metal strip is joined to said second metal strip by spot welding.

14. A method of forming a battery grid suitable for use in a lead-acid battery, the steps comprising:
expanding an outer portion of a metal strip to form a first wire pattern of open grid cells; and
forming a different wire pattern of open grid cells in an unexpanded inner portion of said metal strip.

15. The method as in claim 14, wherein said different wire pattern is formed by stamping.

16. The method as in claim 14, wherein said different wire pattern is formed by perforation.

17. The method as in claim 14, wherein said different wire pattern is radial.

18. The method as in claim 14, wherein said different wire pattern is rectilinear.

19. A method for making a battery grid suitable for use in a lead-acid battery, comprising the steps of:
forming an expanded metal battery grid having an upper and lower portion; and
overlaying a metal strip having a pattern formed therein onto said upper portion of said expanded metal battery grid, wherein said metal strip overlays only said upper portion of said expanded metal grid and defines a grid pattern on said upper portion which is different from a pattern on said lower portion.

20. The method as in claim 19, wherein said metal strip is spot-welded to said expanded metal battery grid.

* * * * *